United States Patent
Aoyagi

(10) Patent No.: US 8,577,046 B2
(45) Date of Patent: Nov. 5, 2013

(54) APPARATUS FOR ESTIMATING SOUND SOURCE DIRECTION FROM CORRELATION BETWEEN SPATIAL TRANSFER FUNCTIONS OF SOUND SIGNALS ON SEPARATE CHANNELS

(75) Inventor: Hiromi Aoyagi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 606 days.

(21) Appl. No.: 12/805,530

(22) Filed: Aug. 4, 2010

(65) Prior Publication Data

US 2011/0075857 A1    Mar. 31, 2011

(30) Foreign Application Priority Data

Sep. 29, 2009    (JP) .................... 2009-225249

(51) Int. Cl.
- H04R 5/00     (2006.01)
- H04R 1/10     (2006.01)
- G01S 3/80     (2006.01)
- H04W 24/00    (2009.01)

(52) U.S. Cl.
USPC ............ 381/26; 381/74; 367/124; 455/456.6

(58) Field of Classification Search
USPC ......... 381/74, 309, 310, 17, 18, 1, 59, 58, 26; 367/118, 124, 125
See application file for complete search history.

(56) References Cited

U.S. PATENT DOCUMENTS

2010/0246845 A1*   9/2010   Burge et al. ............... 381/71.6

FOREIGN PATENT DOCUMENTS

| JP | 2002-267737 A | 9/2002 |
| JP | 2003-139536 A | 5/2003 |
| JP | 2003-167039 A | 6/2003 |

* cited by examiner

*Primary Examiner* — Ping Lee
(74) *Attorney, Agent, or Firm* — Rabin & Berdo, P.C.

(57) ABSTRACT

An apparatus estimates the direction of a sound source from signals plural microphones capture sound to produce. Data are stored on reverse characteristics of spatial transfer functions defined on sound transmitted from sound source positions to the respective microphones. To the signal produced by each microphone, applied are the reverse characteristics of the spatial transfer functions thus stored in connection with that microphone with respect to the sound source positions to thereby estimate a sound source signal on a sound source position associated with the sound captured. Between the sound source signals estimated on the sound source positions associated with the sounds captured by the microphones, coincidence or higher correlation is found on a sound source position to thereby produce information on at least the direction of the sound source thus found.

12 Claims, 5 Drawing Sheets

TIME:n

TIME:n+1

APPARATUS FOR ESTIMATING SOUND SOURCE DIRECTION FROM CORRELATION BETWEEN SPATIAL TRANSFER FUNCTIONS OF SOUND SIGNALS ON SEPARATE CHANNELS

BACKGROUND OF THE INVENTION

1. Field of the Invention

The present invention relates to an apparatus for estimating the direction of a sound source, and more particularly to an apparatus for estimating the direction or orientation of a sound source with respect to a reference position, such as head, of the body of a listener.

2. Description of the Background Art

Humans may recognize the location, such as direction and distance, of a sound source based on a difference in sound heard from the source between the right and left ears. Such a difference between the right and left ears is caused by a difference in distance to the sound source from the right and left ears, and hence differences in characteristics such as frequency, phase and intensity of the sound afforded during the sound being propagated in the air.

When intentionally controlling a sound signal received from a sound source as to a difference in such characteristics as stated above, the sound source may be recognized as located in the intended direction and at the intended distance with respect to the listener. It is so far known that a characteristic afforded to the sound propagated from a sound source to the ears may be well defined by an HRTF (head-related transfer function). When an HRTF is measured in advance from a sound source to the ears and then afforded to a sound source signal, the listener may recognize the sound as coming from an actual sound source. When the movement of the head of the listener is sensed to control the sound signal accordingly, he or she may recognize the sound source as being fixed in absolute location during the movement. For example, when the listener has his or her head turned rightwards or leftwards, the sound source signal may be controlled so as to shift the location of the sound source with respect to the head towards left or right, respectively, thus rendering the listener feel that the sound source is stationary in fact.

As a measure of detecting the orientation or movement of the head of a listener with respect to a sound source, there is known a solution of employing the GPS (Global Positioning System) as disclosed by Japanese Patent Laid-Open Publication No. 2002-267737. There are also known so far a solution of employing an acceleration sensor, as disclosed by Japanese Patent Laid-Open Publication No. 2003-139536, and another solution of utilizing a geomagnetic sensor, as disclosed by Japanese Patent Laid-Open Publication No. 2003-167039.

The conventional solutions disclosed by the above-indicated patent publications are in need of dedicated hardware and thus suffer a problem on the increasing size and cost of the devices.

SUMMARY OF THE INVENTION

It is therefore an object of the present invention to provide an apparatus for estimating the direction of a sound source implemented with small size in hardware and high estimation accuracy.

An apparatus for estimating the direction of a sound source in accordance with the present invention includes: a plurality of sound receivers each for capturing sound to produce on a channel an electric signal corresponding to the sound; a storage for storing data on reverse characteristics of spatial transfer functions, each of which is defined on sound transmitted from different one of virtual sound source positions to different one of the plurality of sound receivers, the virtual sound source positions being supposed with respect to each of the plurality of sound receivers; a sound signal estimator for applying the electric signal on each of the channels to the reverse characteristics of the spatial transfer functions stored in connection with the sound receiver with respect to the virtual sound source positions to thereby estimate a sound source signal at a sound source position associated with the sound captured; a function generator operative in response to the sound source signals estimated in connection with the electric signals on the respective channels for generating a decision function representing coincidence between the sound source signals estimated on the sound source positions associated with the sounds captured on the respective channels; and a direction determiner for using the decision function generated to determine a direction of the sound source position associated with the sound captured on the respective channels, thereby producing information on the direction.

According to the present invention, an apparatus for estimating the direction of a sound source may be provided which can be implemented with small size in hardware and high estimation accuracy.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

With reference to the accompanying drawings, an illustrative embodiment will be described in detail in which the present invention is applied to an apparatus for estimating the location, such as relative direction, of a sound source with respect to the head of a listener.

Initially, in order to better understand the invention, described will be the principle of estimating the direction of a sound source with respect to the head of a listener in accordance with an illustrative embodiment of the present invention. It is noted that the sound source may be ones enunciating voice or acoustic sound, such as music, as well as acoustic noise sources.

Figure 1:
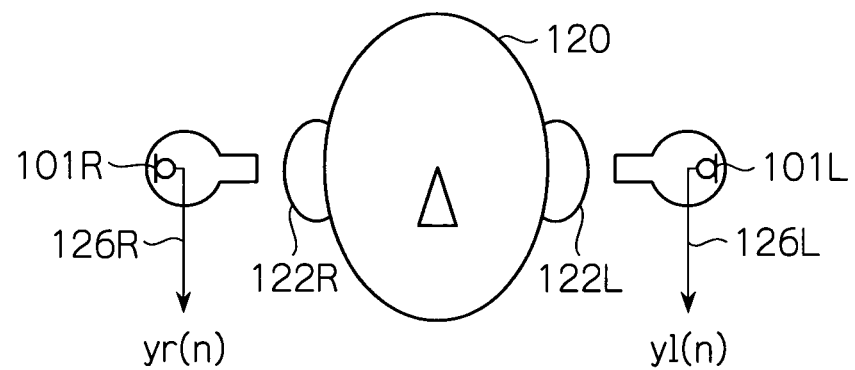
FIG. 1 schematically shows in an elevational view how a pair of microphones are put on for illustrating the estimation principle of a preferred embodiment of the present invention.
Figure 2:
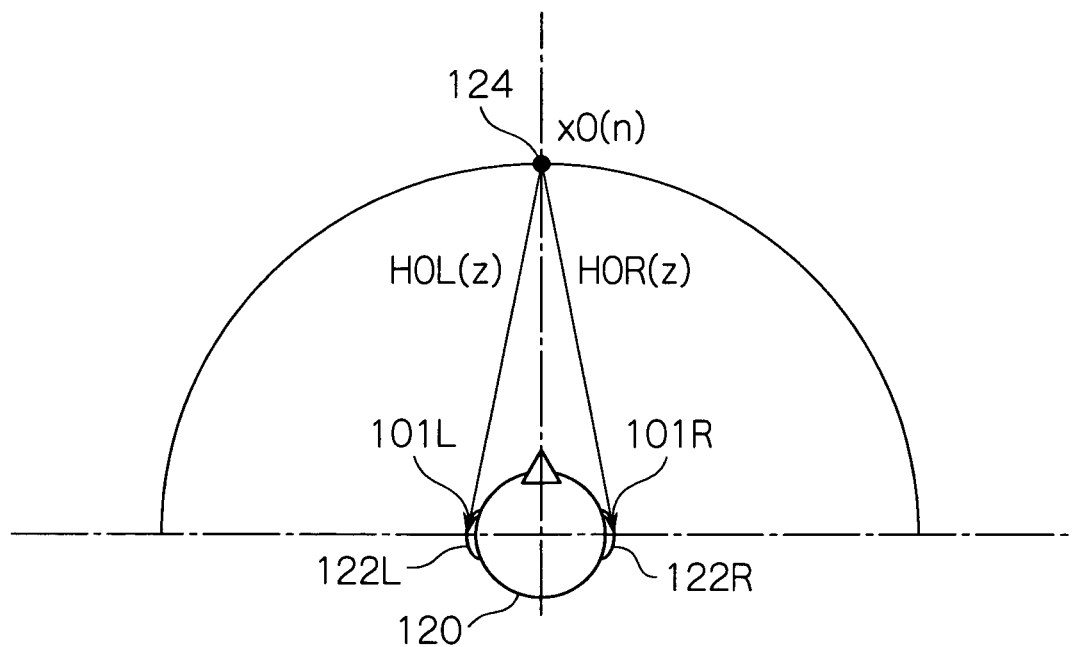
FIG. 2 is a plan view useful for understanding the principle of estimation of the direction of a sound source according to the illustrative embodiment shown in FIG. 1, showing the relationship between the sound source and the paths of the spatial transfer function.

It is now assumed as shown in FIG. 1 that a pair of sound receivers, e.g. microphones, 101R and 101L are provided near or on the right and left ears 122R and 122L, respectively, of a listener 120 to capture sound therearound to produce electric signals representative of the captured sound on the respective channels. The signals corresponding to sounds caught by the microphones for right and left ears 101R and 101L, respectively, are labeled yr(n) and yl(n). Referring to FIG. 2, a signal emanating from a sound source 124 positioned in immediate front of, i.e. at 0 azimuth degree with respect to, the listener 120 is defined as x0(n). Spatial transfer functions, i.e. head-related transfer functions, from the sound source 122 to the right and left ears 122R and 122L are defined as H0R(z) and H0L(z), respectively.

In this case, the relationships represented by the expressions (1) and (2) are established:

$$YR(z)=H0R(z)*x0(z) \qquad (1)$$

$$YL(z)=H0L(z)*x0(z), \qquad (2)$$

where YR(z) and YL(Z) are Z-transforms of yr(n) and yl(n), respectively. It is noted that the numeral "0" included as a parameter in the terms of the expressions represents the angle 0, which means the sound source 124 staying in immediate front of the listener 120. The parameter may depend upon an angle so that it may be represented by corresponding numerals, as in expressions which will appear later bn.

The expressions (1) and (2) may be modified as defined by expressions (3) and (4), respectively:

$$x0(z)=H0R(z)^{-1}*YR(z) \qquad (3)$$

$$x0(z)=H0L(z)^{-1}*YL(z), \qquad (4)$$

where the superscript "−1" represents the inversion, or reverse characteristic, of a spatial transfer function. Thus, the relationships of the expressions (5) and (6) will be established:

$$H0R(z)*H0R(z)^{-1}=1 \qquad (5)$$

$$H0L(z)*H0L(z)^{-1}=1. \qquad (6)$$

From the expressions (3) and (4), it may be seen that, if the orientation, e.g. azimuth angle, of the sound source 124 with respect to the listener 120 is known, then an application of the reverse characteristic of a spatial transfer function associated with that angle to a signal caught by a microphone 101R or 101L may lead to an estimation of a sound signal at the sound source 124, the latter sound signal being referred to below as a "sound source signal". It may further be seen that the sound source signals estimated from the right and left signals caught by the respective microphones, i.e. on the respective channels, coincide with each other. From the perspective of correlation, the two sound source signals coinciding with each other reveal a remarkably high correlation established.

By contrast, if the reverse characteristic of a spatial transfer function for an angle different from the angle of the sound source 124 with respect to the listener 120 is applied, then the sound source signals estimated from the right and left signals captured by the respective microphones 101R and 101L are not coincident with each other. That is, the two captured signals exhibit lower correlation. For example, when the sound source 124 is in immediate front of the listener 120, i.e. the azimuth angle is 0 degree, an application of the reverse characteristic of a spatial transfer function for an angle of 45 degrees renders the sound source signals estimated from the right and left signals captured by the respective microphones 101R and 101L inconsistent with each other. The expressions (7) (8) and (9) indicate such a case:

$$X45R(z)=H45R(z)^{-1}*YR(z)=H45R(z)^{-1}*H0R(z)*x0(z) \qquad (7)$$

$$X45L(z)=H45L(z)^{-1}*YL(z)=H45L(z)^{-1}*H0L(z)*x0(z) \qquad (8)$$

$$x45R(z) \neq x45L(z), \qquad (9)$$

where $H45R(z)^{-1}$ represents the reverse characteristic of a spatial transfer function for a sound source shifted left in position from the immediate front position 124 by 45 angular degrees to the right ear 122R, and similarly $H45L(z)^{-1}$ represents the reverse characteristic of a spatial transfer function for a sound source shifted right in position by 45 degrees from the immediate front position 124 to the left ear 122L. The term x45R(z) is a sound source signal estimated with an angle of 45 degrees from the right sound signal caught by the right microphone 101R, and the term x45L(z) is a sound source signal estimated with the angle of 45 degrees from the left sound signal caught by the left microphone 101L. The terms $H45R(z)^{-1}$. $H0R(z)$ and $H45L(z)^{-1}$. $H0L(z)$ would not be equal to unity (1).

Suppose that, when the angle of an actual sound source with respect to the listener 120 remains unknown, sound signals are caught by the right and left microphones 101R and 101L. Now, on both sound signals, sound source signals are estimated for every angle from 0 to 359 degrees, and then the correlation between the right and left estimated sound source signals is expressed by c(m), where m=0 to 359, referred to as a sound field function. The sound field function exhibits its characteristic where the function takes its value dependent upon the angle (M degrees) of the actual sound source formed from the immediate front position 124 with respect to the listener 120 such that it becomes largest for the angle of the actual sound source and larger for its neighborhood than for the remaining angles, namely c(M) and c($M_{neighborhood}$) are larger than others. Viz., at the angle for which the value of the sound field function becomes greater, the actual sound source may be estimated as residing. The sound field function may thus be used for estimating the azimuth angle of an actual sound source with respect to the listener.

Figure 3:
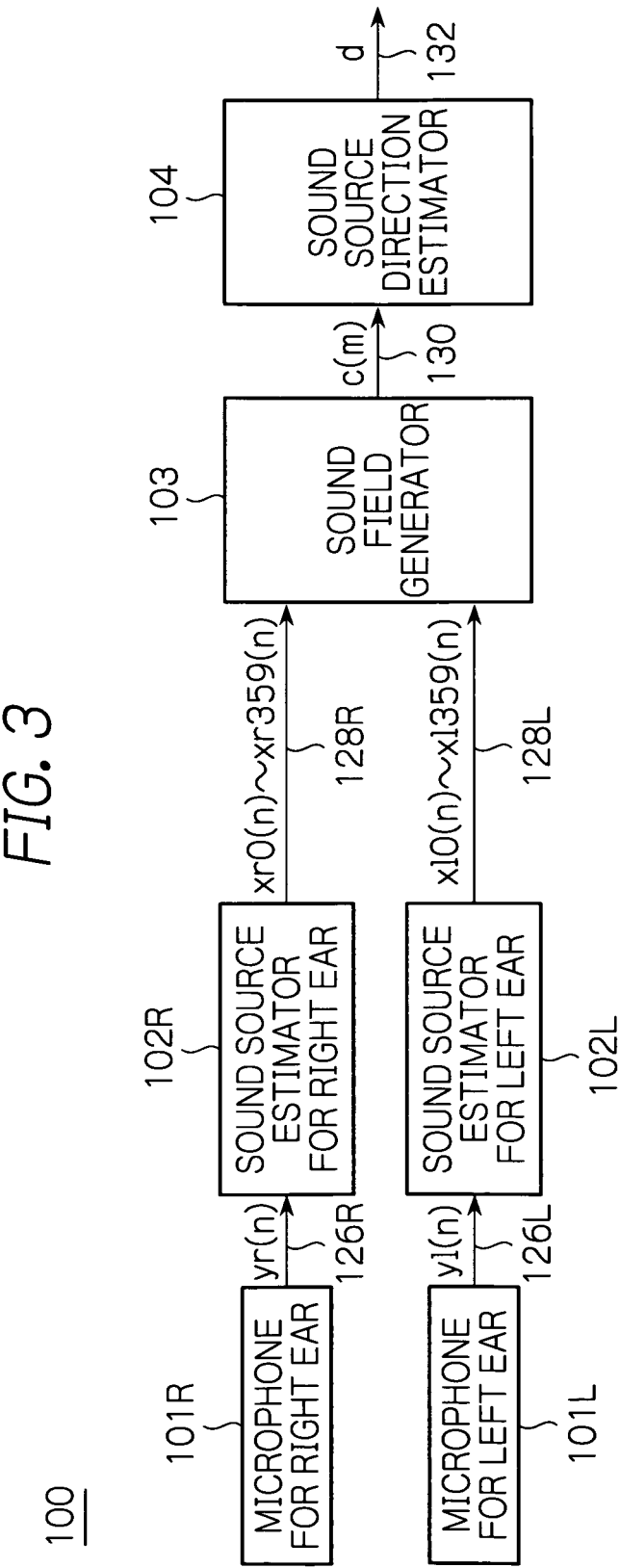
FIG. 3 is a schematic block diagram showing the arrangement of a sound source estimation apparatus according to the illustrative embodiment shown in FIG. 1.

Now, FIG. 3 is a schematic block diagram showing the functional configuration of an apparatus for estimating the direction of a sound source according to the illustrative embodiment operating under the above-mentioned principle.

With reference to FIG. 3, an apparatus 100 for estimating the direction of a sound source of the illustrative embodiment includes a pair of microphones 101R and 101L for use in the right and left ears 122R and 122L of a listener 120, respectively. The microphones 101R and 101L have the outputs thereof 126R and 126L, respectively, interconnected to sound source estimators for right and left ears 102R and 102L. The sound source estimators 102R and 102L have the outputs thereof 128R and 128L interconnected to a sound field generator 103, which has its output 130 interconnected to a sound source direction estimator 104. Like components are designated with the same reference numerals throughout the patent application.

It is observed that components other than the microphones 101R and 101L may be implemented by a processor system including a CPU (central processor unit) or a DSP (digital signal processor) on which program sequences may be installed and executed for functioning as an apparatus for estimating the direction of a sound source. Such a processor system may be implemented in the form of built-in computer. In this connection, the illustrative embodiment is depicted and described as configured by separate functional blocks. It is however to be noted that such a depiction and a description do not restrict the apparatus 100 to an implementation only in the form of hardware but the apparatus 100 may at least partially be implemented by software, as described above. That may also be the case with an alternative embodiment which will be described below. In this regard, the word "circuit" may be understood not only as hardware, such as an electronics circuit, but also as a function that may be implemented by software installed and executed on a computer.

The microphones for right and left ears 101R and 101L are provided for capturing sound therearound, especially the sound emanating from a sound source, such as 124 shown in FIG. 2, to produce a corresponding electric signals yr (n) and yl (n) on the outputs 126R and 126L, respectively. Signals are designated with reference numerals of connections on which they are conveyed.

The sound source estimator for right ear 102R is adapted for using the signal yr(n) caught by the microphone for right ear 101R and the reverse characteristic of a spatial transfer function for every value of angle for the right ear 122R to perform calculations as defined by the expression (3) to yield estimated sound source signals $xr0(n)$ to $xr359(n)$ for the right ear 122R, i.e. right channel, for the respective values of angle. The data of spatial transfer functions for all angles with respect to the right ear 122R are prepared and stored in advance in a storage, not shown, of the sound source estimator for right ear 102R.

Similarly, the sound source estimator for left ear 102L is adapted for using the signal yl(n) caught by the microphone for left ear 101L and the reverse characteristic of a spatial transfer function for every value of angle for the left ear 122L to perform calculations as defined by the expression (4) to produce estimated sound source signals $xl0(n)$ to $xl359(n)$ for the left ear 122L, i.e. left channel, for the respective values of angle. The data of spatial transfer functions for all values of angle with respect to the left ears 122L are prepared and stored in advance in the sound source estimator for left ear 102L. In the instant embodiment, such data for the right and left ears 102R and 102L are prepared for each of angular degrees, i.e. 0, 1, 2, 3, . . . , 359 degrees, with respect to right and left ears, respectively. Namely, it can be said that with the instant embodiment the data on spatial transfer functions are prepared for all virtual sound source positions residing at every positive integer angular value with respect to each of the right and left ears. That renders one angular degree of estimation accuracy, or resolution. The system may of course be implemented with other values of resolution in sound source direction estimation.

The sound field generator 103 is adapted to receive the estimated sound source signals for right and left ears xrm(n) and xlm(n) to generate the above-mentioned sound field function c(m) on its output 130.

Figure 4:
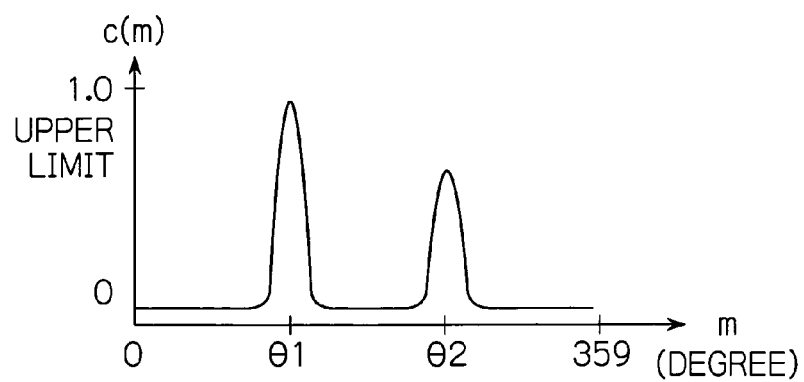
FIG. 4 is a graph plotting an exemplified transfer function $c(m)$ according to the illustrative embodiment.

The sound source direction estimator 104 is adapted to receive the value of the sound field function c(m) on its input 130 to estimate a sound source direction. In a case where a single sound source is being estimated, the sound source direction estimator 104 may determine an angle θ at which the sound field function c(m) becomes maximum to thereby estimate the angle thus determined as a signal representing a resultant sound source direction d, which will be developed on its output 132 In a case where plural sound sources are being estimated, the sound source direction estimator 104 may determine the angles, e.g. θ1 and θ2, FIG. 4, at which the locally maximum values exceeding a predetermined threshold value are exhibited on the curve of sound field function c(m) to thereby estimate those angles as resultant sound source directions different from each other.

In operation, the microphones for right and left ears 101R and 101L receive voice or acoustic sound from the environment including a sound source or sources, exemplified by 124, FIG. 2, to produce corresponding electric signals yr(n) and yl(n), respectively.

The signal yr(n), developed from the microphone for right ear 101R, is multiplied by the sound source estimator for right ear 102R with the reverse characteristics of the spatial transfer functions for the respective angles for the right ear 122R stored in a storage, not shown, of the estimator 102R to thereby output estimated sound source signals for right ear $xr0(n)$ to $xr359(n)$ for the entire angles. Similarly, the signal yl (n), developed from the microphone for left ear 101L, is multiplied by the sound source estimator for left ear 102L with the reverse characteristics of the spatial transfer functions for the respective angles for the left ear 122L also stored in a storage, not shown, of that estimator 102L to thereby output estimated sound source signals for left ear $xl0(n)$ to $xl359(n)$ for the entire angles.

The estimated sound source signals for right and left ears yrm(n) and ylm(n) thus developed are received by the sound field generator 103, which will in turn produce a sound field function c(m) on its output 130.

The sound source direction estimator 104 receives the sound field function c(m) and detects the maximum value or locally maximum value or values of the sound field function c(m) to thereby determine an angle or angles associated with the maximum or locally maximum value or values as a resultant sound source direction or directions.

In the illustrative embodiment described above, the sound source direction is thus estimated by calculations which use only a voice or acoustic sound signal captured by the left and right microphones. Hence, it is not mandatory to use complicated hardware dedicated therefor, thus enabling the direction of a sound source or sources to be estimated with high accuracy despite small in device size or low in cost.

The illustrative embodiment described above is based upon the distance of the sound source to the microphones for right and left ears 101R and 101L on the other being known approximately constant.

If the distance of the sound source to the microphones for right and left ears 101R and 101L is not known, the reverse characteristics of the spatial transfer functions of respective angles for the left and right ears are prepared for a plurality of distances, differing by 50 cm each, for example, and the sound source directions are estimated for each of those distances. If the maximum or locally maximum value is detected through the estimation, it is determined whether or not the maximum or locally maximum value, thus detected, exceeds a predetermined threshold value. If exceeded, it is then determined that the sound source is present at the distance in the direction thus estimated.

With reference to further figures of the drawings, an alternative embodiment of the present invention will now be described in which the invention is applied to estimating the azimuth or orientation of the head of a listener.

Initially, description will be made on the principle of estimating the azimuth or orientation of the head of a listener, as applied in the alternative embodiment of apparatus for estimating the direction of a sound source. It is noted that, in the present alternative embodiment, the sound source is substantially fixed in position even though for a short period of time.

Figure 5A:
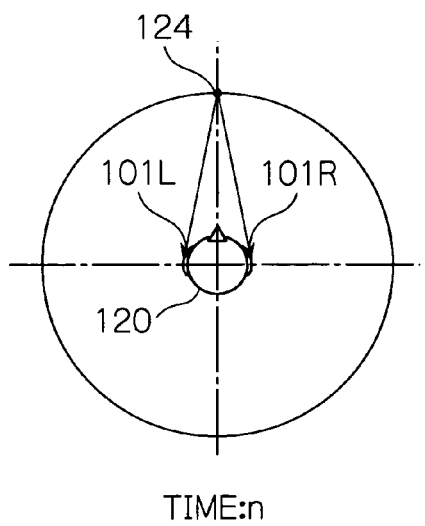
FIGS. 5A and 5B are plan views, like FIG. 2, useful for understanding the principle of estimation according to an alternative embodiment of the present invention.
Figure 5B:
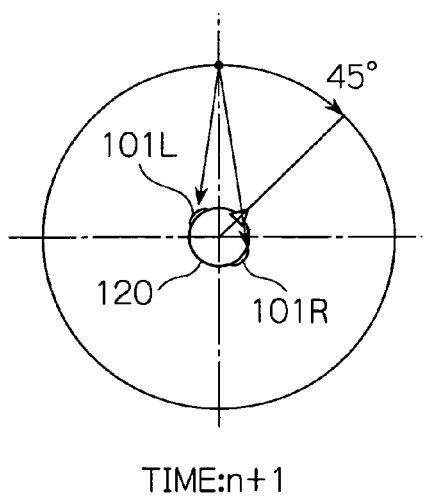

FIGS. 5A and 5B are plan views useful for understanding the principle of estimation of sound source direction of the instant alternative embodiment. At a time point n, FIG. 5A, the sound source location is in immediate front (angle 0) of the listener 120, and the sound field function $c_n(m)$ has its characteristic taking a largest or larger value at, or in the vicinity of, $c_n(0)$. In the notation of the sound field function $c_n(m)$, the letter "n" denotes a discrete time n. When the listener 120 has his or her head turned towards right by 45 degrees at time n+1, FIG. 5B, from its position at time n, the characteristic of the sound field function $c_{n+1}(m)$ will exhibit its largest or larger value at or in the vicinity of $c_{n+1}(45)$.

Between the sound field functions $c_n(m)$ and $c_{n+1}(m)$ at time points n and n+1, the relationship defined by the expression (10) is established:

$$c_{n+1}(0)=c_n(315)$$

$$c_{n+1}(44)=c_n(359)$$

$$c_{n+1}(45)=c_n(0)$$

$$\ldots$$

$$c_{n+1}(359)=c_n(314). \tag{10}$$

In short, the sound field function $c_{n+1}(m)$ at time n+1 appears corresponding to a sound field function in the direction in which the sound field function $c_n(m)$ at time n is rotated towards left by 45 azimuth degrees with respect to the listener 120. From this, it is seen that the measurement of temporal changes of the sound field function allows the listener to be estimated as having his or her head turned in the direction opposite to the direction in which the sound field function appears rotated.

Figure 6:
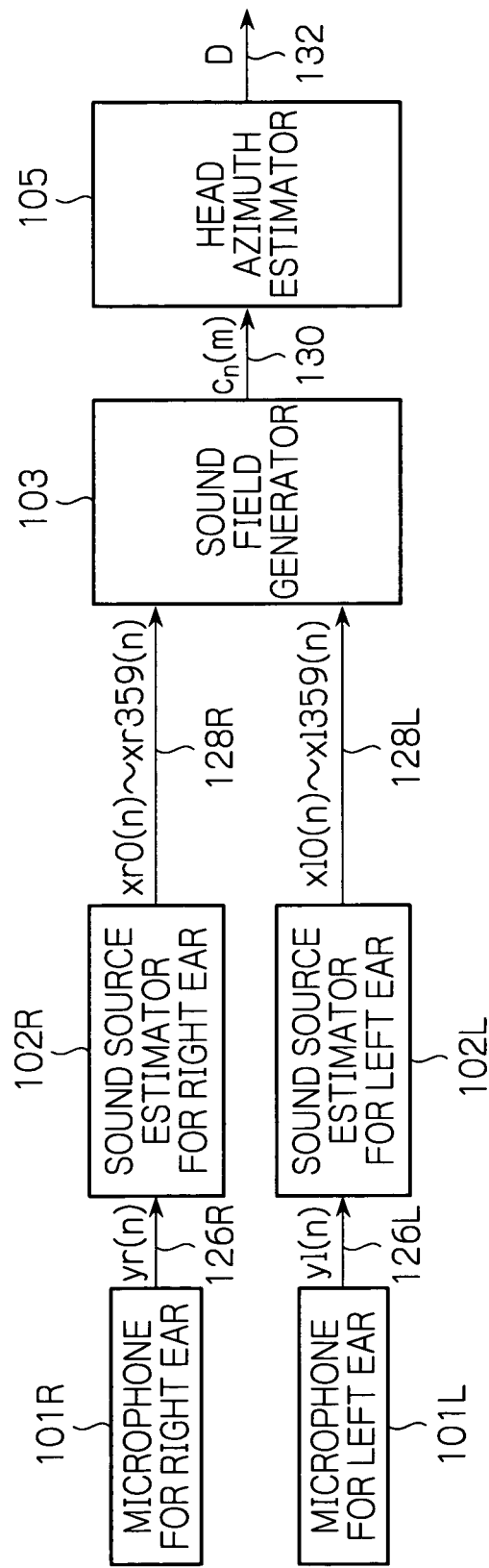
FIG. 6 is a schematic block diagram, like FIG. 3, showing the arrangement of a sound source estimation apparatus according to the alternative embodiment.

FIG. 6 is a schematic block diagram showing the functional configuration of the apparatus for estimating the direction of a sound source of an alternative embodiment which is adapted for operating under the above-mentioned principle. As may be understood from the FIG. 6, an apparatus 100A for estimating the direction of a sound source of the alternative embodiment includes a head azimuth estimator 105 in place of the sound source direction estimator 104 in the embodiment shown in and described with reference to FIG. 3.

The head azimuth estimator 105 is adapted to store data of a sound field function $c_{n-1}(m)$ at a previous time point n-1. The head azimuth estimator 105 is further adapted to be responsive to data of a sound field function $c_n(m)$ at a current time point n, when newly supplied from the sound field generator 103, to find an angular deviation D for which the relationship defined by the above expression (10) is established to thereby output a signal representing this angular deviation D on its output 132 as an estimated change in azimuth from the previous time point n-1.

The head azimuth direction estimator 105 may be adapted to find out the angular deviation D, for which the relationship defined by the expression (10) is valid, in the manner described below only by way of an example. For each of the sound field functions $c_{n-1}(m)$ and $c_n(m)$ plural locally maximum values, inclusive of maximum values, are determined, as well as plural angular differences of a locally maximum value of interest from its neighboring locally maximum values. With the angular differences between these neighboring locally maximum values being taken into account, the locally maximum values in the sound field function $c_{n-1}(m)$ of interest are rendered correlated with those in the other sound field function $c_n(m)$. The angular deviations between the locally maximum values, thus correlated with one another, are averaged. It is then checked that the angular deviations may apply for angles other than the locally maximum values as well to thereby obtain the angular deviation D for which the relationship defined by the expression (10) holds.

With the alternative embodiment, the sound field functions may thus be found by calculations that use only a voice or acoustic sound signal caught by the left and right microphones, and time changes in the sound field functions may be observed, thus allowing changes in the head azimuth to be estimated. It is thus not mandatory to use complicated hardware dedicated therefor, achieving the estimation with high accuracy despite small in device size or low in cost.

In the above-described alternative embodiment, the sound source is fixed while the head is turned. To a reverse case in which the head azimuth is fixed and the sound source is turned about the head of a listener, however, the technical concept of the alternative embodiment may also be applied.

In the illustrative embodiments described above, the pair of microphones are provided in the vicinity of left and right ears of a listener. The microphones may, however, be positioned in other places than described above. For example, a couple of microphones may be fitted on the corresponding shoulders of a listener to estimate the orientation or azimuth of a sound source with respect to his or her torso.

The illustrative embodiments are adapted to use the pair of microphones in order to determine a desired orientation or azimuth on in a plane formed by the pair of microphones and a sound source. Alternatively, three or more microphones may be used in order to determine a desired orientation or azimuth. For example, first, second and third microphones are disposed at the respective apices of a triangle. The first and second microphones capture sound which will be used to determine a desired orientation or azimuth on a first plane formed by the first and second microphones and the sound source positioned. Similarly, the second and third microphones capture sound which will be used to determine a desired orientation or azimuth on a second plane formed by the second and third microphones and the sound source. Further, the third and first microphones capture sound which will be used to determine a desired orientation or azimuth on a third plane formed by the third and first microphones and the sound source. The data on the three different orientations or azimuths may then be organized so as to ultimately estimate the orientation or azimuth of the sound source in the three-dimensional space.

Figure 7:
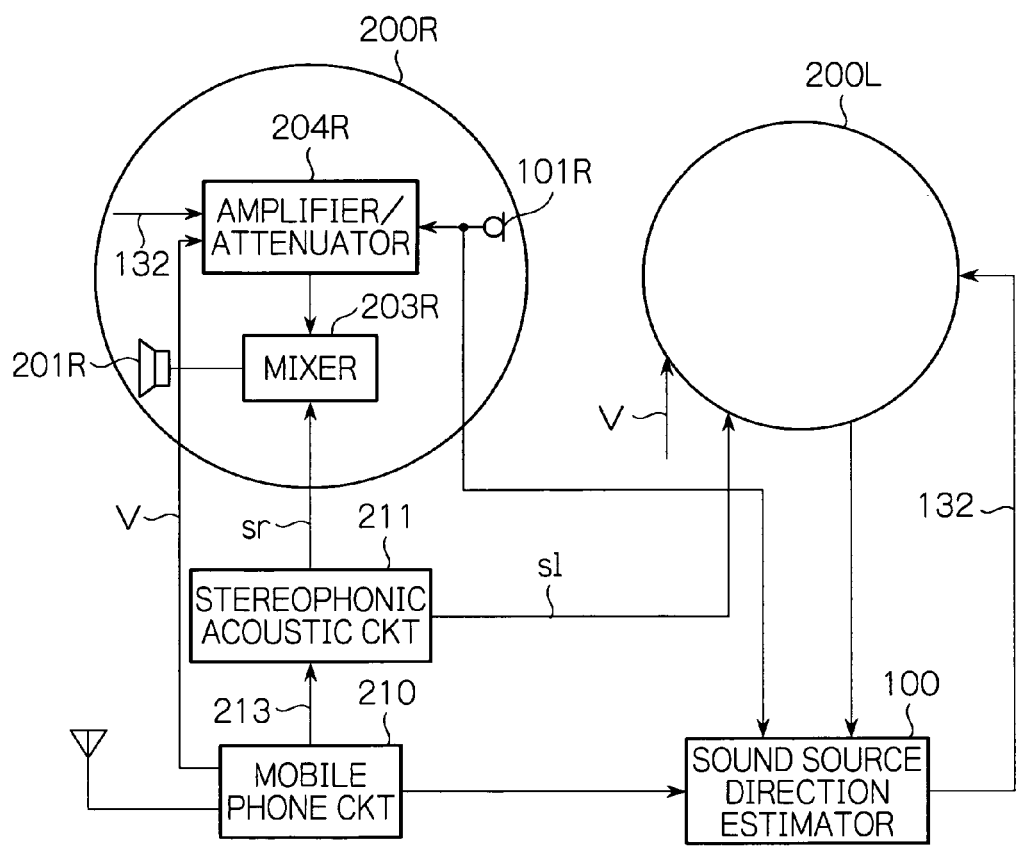
FIG. 7 is a schematic block diagram showing an application including the sound source estimation apparatus in accordance with the illustrative embodiment shown in FIG. 3.

The present invention is broadly applicable to various fields. FIG. 7 is a schematic block diagram showing an example of application of the apparatus 100 for estimating the direction of a sound source of the illustrative embodiment shown in and described with reference to FIG. 3 to a mobile phone terminal set. In FIG. 7, reference numerals 200R and 200L denote ear pads of a headphone set for right and left ears. The inner structure of the ear pad for right ear 200R is exemplarily shown in detail. The other ear pad 200L may be the same as the ear pad 200R in inner structure. The ear pad 200R will therefore be described in detail. The constituent elements of the left ear pad 200L will be sometimes designated with reference numerals corresponding to the right ones followed by suffix "L" although not specifically depicted in the figure.

Specifically as shown, the ear pad for right ear 200R contains the microphones 101R described above, as well as a loudspeaker 201R, a mixer 203R and an amplifier/attenuator 204R, which are interconnected as depicted. The system includes a mobile phone circuit 210 which is adapted to produce a status signal V, indicating whether or not the system is under phone connection established, to the amplifier/attenuators 204R and 204L, while producing a received voice signal 213 under call connection established to a stereophonic acoustic circuit 211.

The stereophonic acoustic circuit 211 is adapted to apply a head-related transfer function to the received voice signal 213 to thereby form received voice signals for right and left ears sr and sl, which respectively define received voice signals coming from a virtual sound source, such as 124, FIG. 2, positioned in immediate front of a listener at respective predetermined distances from the right and left ears 122R and 122L. The received voice signals sr and sl are transferred to the mixers 203R and 203L, respectively.

The sound signals caught by the microphones 101R and 101L are delivered to the respective amplifier/attenuator 204R and 204L as well as the apparatus 100 for estimating the direction of a sound source. The estimation apparatus 100 operates as described in detail before, thus developing on its output 132 the sound source signal and the sound source direction signal d resultant from the calculation performed by means of the expressions (3) and (4).

While the system is currently not in the state of call connected, the amplifier/attenuators 204R and 204L transfer signals representing sound captured by the microphones 101R and 101L, respectively, either directly or slight amplified, via the mixers 203R and 203L to the loudspeakers 201R and 201L, which in turn output the signals, thus transferred, in the form of audible sound. Hence, the listener wearing the headphone set may hear the ambient sound.

While the system is currently in the state of call connected, the amplifier/attenuators 204R and 204L are responsive to the signal representative of the directions of ambient sound sources and sound source signals at these sound sources delivered from apparatus 100 for estimating the direction of a sound source to thereby significantly attenuate or remove sound source signals from ambient sound sources located within a predetermined angular range from the immediate front 124 with respect to the right and left ears 122R and 122L, respectively, whereas the amplifier/attenuators 204R and 204L deliver sound source signals from ambient sound sources located outside the predetermined angular range, without substantially being attenuated, via the mixers 203R and 203L to the corresponding loudspeakers 201R and 201L, respectively, which in turn output the signals, thus transferred, in the form of audible sound. Hence, the listener could not heard during call connection established the ambient sound, whose sound source locations are close to the virtual sound source such as 124 of the received voice signal. Conversely, the ambient sound coming from the sound source significantly differing in direction from the virtual sound source of the received voice signal can be heard even during call connection established.

The entire disclosure of Japanese patent application No. 2009-225249 filed on Sep. 29, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An apparatus for estimating a direction of a sound source, comprising:
   a plurality of sound receivers each for capturing sound to produce on a channel an electric signal corresponding to the sound;
   a storage for storing data on reverse characteristics of spatial transfer functions, each of which is defined on sound transmitted from different ones of virtual sound source positions to different ones of said plurality of sound receivers, the virtual sound source positions being assigned with respect to each of said plurality of sound receivers;
   a sound signal estimator for applying the electric signal on each of the channels to the reverse characteristics of the spatial transfer functions stored in connection with the respective sound receiver with respect to the virtual sound source positions to thereby estimate a sound source signal at a sound source position associated with the sound captured;
   a function generator operative in response to the sound source signals estimated in connection with the electric signals on the respective channels for generating a decision function representing coincidence between the sound source signals estimated for the sound source positions associated with the sounds captured on the respective channels; and
   a direction determiner for using the decision function generated to determine a direction of the sound source position associated with the sound captured on the respective channels, thereby producing information on the direction.

2. The apparatus according to claim 1, wherein said direction determiner uses the decision function generated to find one of the virtual sound source positions which is higher in coincidence to thereby determine the direction with respect to each of said plurality of sound receivers of the sound source associated with the sound captured.

3. The apparatus according to claim 1, wherein said direction determiner detects a temporal change in the decision function generated to determine a positional change of said plurality of sound receivers with respect to the sound source associated with the sound captured.

4. The apparatus according to claim 1, wherein said plurality of sound receivers consists of a pair of sound receivers for use adjacent a right and a left ear of a person.

5. The apparatus according to claim 1, wherein the decision function is a sound field function defining correlation between the estimated sound source signals with respect to an angle of the sound source positions with respect to each of said plurality of sound receivers.

6. A mobile phone terminal set comprising an apparatus for estimating a direction of a sound source, said apparatus comprising:
   a plurality of sound receivers each for capturing sound to produce on a channel an electric signal corresponding to the sound;
   a storage for storing data on reverse characteristics of spatial transfer functions, each of which is defined on sound transmitted from different ones of virtual sound source positions to different ones of said plurality of sound receivers, the virtual sound source positions being assigned with respect to each of said plurality of sound receivers;
   a sound signal estimator for applying the electric signal on each of the channels to the reverse characteristics of the spatial transfer functions stored in connection with the respective sound receiver with respect to the virtual sound source positions to thereby estimate a sound source signal at a sound source position associated with the sound captured;
   a function generator operative in response to the sound source signals estimated in connection with the electric signals on the respective channels for generating a decision function representing coincidence between the sound source signals estimated for the sound source positions associated with the sounds captured on the respective channels; and a direction determiner for using the decision function generated to determine a direction of the sound source position associated with the sound captured on the respective channels, thereby producing information on the direction.

7. A non-transitory computer-readable medium on which is stored a program for controlling, when installed in and executed by a computer, the computer to estimate a direction of a sound source from electric signals which a plurality of sound receivers capture sound to produce on respective channels, said program allowing the computer to act as:

a storage for storing data on reverse characteristics of spatial transfer functions, each of which is defined on sound transmitted from different ones of virtual sound source positions to different ones of said plurality of sound receivers, the virtual sound source positions being assigned with respect to each of said plurality of sound receivers;

a sound signal estimator for applying the electric signal on each of the channels to the reverse characteristics of the spatial transfer functions stored in connection with the respective sound receiver with respect to the virtual sound source positions to thereby estimate a sound source signal at a sound source position associated with the sound captured;

a function generator operative in response to the sound source signals estimated in connection with the electric signals on the respective channels for generating a decision function representing coincidence between the sound source signals estimated for the sound source positions associated with the sounds captured on the respective channels; and a direction determiner for using the decision function generated to determine a direction of the sound source position associated with the sound captured on the respective channels, thereby producing information on the direction.

8. A method for estimating a direction of a sound source, comprising:

using a plurality of sound receivers each capturing sound to produce on a channel an electric signal corresponding to the sound;

storing in a storage data on reverse characteristics of spatial transfer functions, each of which is defined on sound transmitted from different ones of virtual sound source positions to different ones of said plurality of sound receivers, the virtual sound source positions being assigned with respect to each of the plurality of sound receivers;

applying the electric signal on each of the channels to the reverse characteristics of the spatial transfer functions stored in connection with the respective sound receiver with respect to the virtual sound source positions to thereby estimate a sound source signal at a sound source position associated with the sound captured;

using the sound source signals estimated in connection with the electric signals on the respective channels to generate a decision function representing coincidence between the sound source signals estimated for the sound source positions associated with the sounds captured on the respective channels; and using the decision function generated to determine a direction of the sound source position associated with the sound captured on the respective channels, thereby producing information on the direction.

9. The method according to claim 8, further comprising using, in determining the direction of the sound source, the decision function generated to find one of the virtual sound source positions which is higher in coincidence to thereby determine the direction with respect to each of said plurality of sound receivers of the sound source associated with the sound captured.

10. The method according to claim 8, further comprising detecting, in determining the direction of the sound source, a temporal change in the decision function generated to determine a positional change of said plurality of sound receivers with respect to the sound source associated with the sound captured.

11. The method according to claim 8, wherein the plurality of sound receivers consists of a pair of sound receivers for use adjacent a right and a left ear of a person.

12. The method according to claim 8, wherein the decision function is a sound field function defining correlation between the estimated sound source signals with respect to an angle of the sound source positions with respect to each of said plurality of sound receivers.

* * * * *